United States Patent
Liu et al.

(10) Patent No.: US 9,321,342 B2
(45) Date of Patent: Apr. 26, 2016

(54) MULTI-MODE MODULAR ELECTRICALLY VARIABLE TRANSMISSION

(71) Applicants: Bradford Liu, Bloomfield Hills, MI (US); Feisel F Weslati, Troy, MI (US)

(72) Inventors: Bradford Liu, Bloomfield Hills, MI (US); Feisel F Weslati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 72 days.

(21) Appl. No.: 14/284,798

(22) Filed: May 22, 2014

(65) Prior Publication Data

US 2015/0337926 A1 Nov. 26, 2015

(51) Int. Cl.
| | |
|---|---|
| F16H 3/72 | (2006.01) |
| B60K 6/445 | (2007.10) |
| B60K 6/365 | (2007.10) |
| B60K 6/547 | (2007.10) |
| F16H 37/10 | (2006.01) |

(52) U.S. Cl.
CPC ............. B60K 6/445 (2013.01); B60K 6/365 (2013.01); B60K 6/547 (2013.01); F16H 3/728 (2013.01); F16H 2037/102 (2013.01); F16H 2037/104 (2013.01); F16H 2037/107 (2013.01); F16H 2200/2012 (2013.01); F16H 2200/2038 (2013.01); F16H 2702/00 (2013.01); Y10S 903/917 (2013.01)

(58) Field of Classification Search
CPC ... Y10S 903/917; Y02T 10/6247; B60K 6/54; F16H 3/666; F16H 2702/00
See application file for complete search history.

(56) References Cited

U.S. PATENT DOCUMENTS

| | | | | |
|---|---|---|---|---|
| 3,590,262 | A * | 6/1971 | Sheffield | H02K 23/52 290/46 |
| 6,005,297 | A * | 12/1999 | Sasaki | B60K 6/365 180/65.235 |
| 6,208,036 | B1 * | 3/2001 | Evans | B60K 6/485 180/65.265 |
| 6,984,783 | B2 * | 1/2006 | Kusumi | B60L 11/14 174/17 R |
| 7,005,764 | B2 * | 2/2006 | Petersen | H02K 16/04 310/112 |
| 7,252,613 | B2 | 8/2007 | Bucknor | |
| 7,367,910 | B2 | 5/2008 | Schmidt | |
| 7,586,225 | B2 * | 9/2009 | Raszkowski | H02K 5/225 180/65.21 |
| 8,066,609 | B2 | 11/2011 | Kersting | |
| 8,226,515 | B2 | 7/2012 | Phillips | |
| 2004/0266241 | A1 * | 12/2004 | Tsukashima | B60R 16/0215 439/212 |

(Continued)

OTHER PUBLICATIONS

International Search Report and Written Opinion dated Aug. 14, 2015 for International Application No. PCT/US2015/031670, International Filing Date May 20, 2015.

*Primary Examiner* — Sherry Estremsky
(74) *Attorney, Agent, or Firm* — Ralph E. Smith

(57) ABSTRACT

A modular electrically variable transmission includes at least one of a sun-shared module and a sun and ring-shared module assembled to form a two-module electrically variable transmission having a shiftable motor speed reducer subassembly and an electrically variable transmission subassembly. The sun-shared module includes a first motor-generator, an input, and primary and secondary planetary gear sets each having respective primary and secondary ring gears, carriers and associated pinion gears. The pinion gears are in meshing engagement with a single first shared sun gear that is non-rotatably coupled to the first motor-generator. The sun and ring-shared module includes a second motor-generator, a second input, a second shared sun gear and a shared ring gear, and primary and second secondary planetary gear sets. The secondary planetary gear set includes a secondary carrier supporting outer and inner pinion gears. The second shared sun gear is non-rotatably coupled to the second motor-generator.

18 Claims, 10 Drawing Sheets

(56) References Cited

U.S. PATENT DOCUMENTS

| | | | |
|---|---|---|---|
| 2005/0208782 A1* | 9/2005 | Reed | H01R 4/307 439/34 |
| 2007/0129196 A1 | 6/2007 | Bucknor et al. | |
| 2007/0129203 A1 | 6/2007 | Raghavan et al. | |
| 2007/0225099 A1 | 9/2007 | Cho et al. | |
| 2009/0093331 A1 | 4/2009 | Iwanaka et al. | |
| 2009/0275438 A1 | 11/2009 | Kersting | |
| 2012/0065016 A1 | 3/2012 | Tamai | |
| 2012/0264555 A1 | 10/2012 | Robinette | |

* cited by examiner

MULTI-MODE MODULAR ELECTRICALLY VARIABLE TRANSMISSION

FIELD

The present disclosure relates generally to a transmission for a motor vehicle and, more particularly, to a multi-mode modular electrically variable transmission for a hybrid vehicle.

BACKGROUND

A power split transmission is one type of transmission used for hybrid electric vehicles (HEV). Power split transmissions can utilize two electric motors ("e-motors") and can utilize epicyclic differential gearing (i.e., planetary gear sets) in a way that transmits part of the power of an internal combustion engine through a mechanical path to the output, and transmits another part on an electrical path. The electrical path typically includes the two e-motors, where one of them operates as a motor and the other as a generator. By varying the speeds of the e-motors, variable transmission ratios for transmitting engine power to ground can be obtained. Such a transmission arrangement can be referred to as an electrically variable transmission (EVT), as is known to one of ordinary skill in the art. The EVT can include different operating modes, such as electric-only, engine-only (fixed gears, also referred to as mechanical points), and one or more electrically variable modes. Such conventional multi-mode EVTs, however, do not maximize the capability of the main electric motor while providing a shift-free input-output split EVT core. These multi-mode EVTs are also typically application specific and are not manufactured to share core components. For example, these conventional EVTs are not configured to be cost-effectively utilized in both a front wheel drive application and a rear wheel drive application without requiring a redesign of the EVT. Thus, while conventional multi-mode EVTs work for their intended purpose, there remains a need for improvement in the relevant art.

SUMMARY

In one exemplary aspect, a modular electrically variable transmission is provided in accordance with the teachings of the present disclosure. The modular electrically variable transmission includes, in this exemplary aspect, at least one of a sun-shared module and a sun and ring-shared module assembled to form a two-module electrically variable transmission having a shiftable motor speed reducer (MSR) subassembly and an electrically variable transmission (EVT) subassembly. The sun-shared module includes, in this exemplary aspect, a first motor-generator, a first input member, a first primary planetary gear set and a first secondary planetary gear set each having respective primary and secondary ring gear members, carrier members and associated pinion gear members. The pinion gear members are in meshing engagement with a single first shared sun gear member that is non-rotatably coupled to the first motor-generator. The first input member is non-rotatably coupled to the primary carrier member. The sun and ring-shared module includes, in this exemplary aspect, a second motor-generator, a second input member, a single second shared sun gear member and a single shared ring gear member, a second primary planetary gear set, and a second secondary planetary gear set. The second primary planetary gear set includes a second primary carrier member rotatably supporting pinion gear members in meshing engagement with the second shared sun gear member and the shared ring gear member. The second secondary planetary gear set includes a second secondary carrier member supporting outer and inner pinion gear members in meshing engagement with each other. The outer pinion gear member is in meshing engagement with the shared ring gear member and the inner pinion gear member is in meshing engagement with the second shared sun gear member. The second shared sun gear member is non-rotatably coupled to the second motor-generator, and the second input member is non-rotatably coupled to the second primary carrier member.

In another exemplary aspect, a modular electrically variable transmission is provided in accordance with the teachings of the present disclosure. The modular electrically variable transmission includes, in this exemplary aspect, at least one of a sun-shared module and a sun and ring-shared module assembled to form a two-module electrically variable transmission having a shiftable motor speed reducer (MSR) subassembly and an electrically variable transmission (EVT) subassembly. The sun-shared module includes, in this exemplary aspect, a first motor-generator, a first input member, a first primary planetary gear set and a first secondary planetary gear set each having respective primary and secondary ring gear members, carrier members and associated pinion gear members. The pinion gear members are in meshing engagement with a single first shared sun gear member that is non-rotatably coupled to the first motor-generator. The first input member is non-rotatably coupled to the primary carrier member. The sun and ring-shared module includes, in this exemplary aspect, a second motor-generator, a second input member, a single second shared sun gear member and a single shared ring gear member, a second primary planetary gear set, and a second secondary planetary gear set. The second primary planetary gear set includes a second primary carrier member rotatably supporting pinion gear members in meshing engagement with the second shared sun gear member and the shared ring gear member. The second secondary planetary gear set includes a second secondary carrier member supporting outer and inner pinion gear members in meshing engagement with each other. The outer pinion gear member is in meshing engagement with the shared ring gear member and the inner pinion gear member is in meshing engagement with the second shared sun gear member. The second shared sun gear member is non-rotatably coupled to the second motor-generator, and the second input member is non-rotatably coupled to the second primary carrier member. The MSR subassembly includes, in an exemplary aspect, first and second torque transfer devices selectively engagable to provide first and second motor speed ratios of one of the first and second motor-generators. The EVT subassembly includes, in an exemplary aspect, a third torque transfer device selectively engagable to ground an output from an engine to provide an electric-only mode of operation.

In some implementations, the assembled two-module EVT includes two sun-shared modules operably coupled together with one sun-shared module forming the MSR sub-assembly and the other sun-shared module forming the EVT subassembly. In an exemplary aspect, the MSR subassembly and the EVT subassembly are operably coupled in a coaxial configuration such that a center of rotation of each subassembly is coaxially aligned.

In some implementations, the assembled two-module EVT includes one sun-shared module operably coupled with one sun and ring-shared module, with the sun-shared module forming the EVT subassembly and the sun and ring-shared module forming the MSR subassembly. In an exemplary aspect, the MSR subassembly and the EVT subassembly are operably coupled in an axially offset configuration such that a center of rotation of each subassembly is axially offset.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
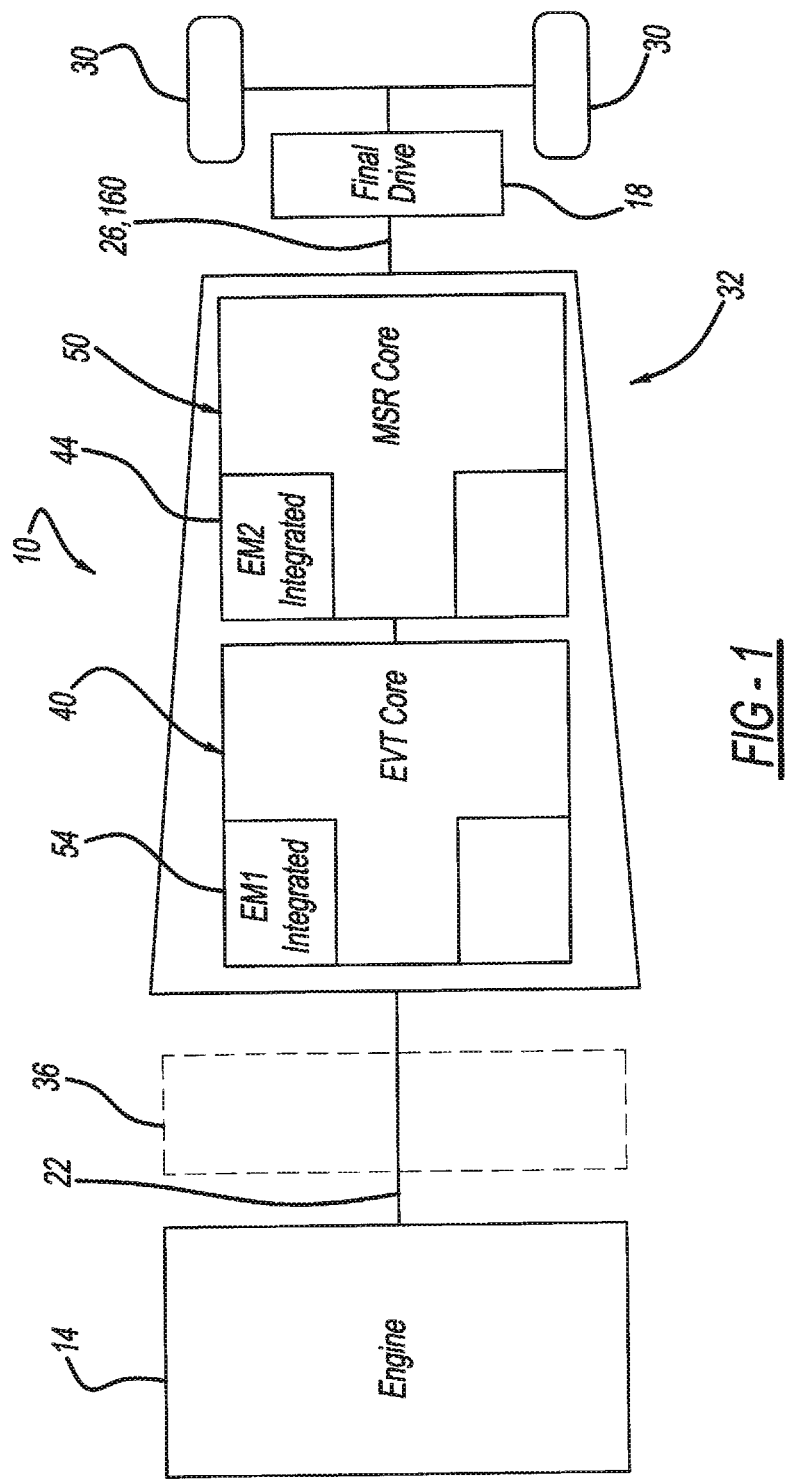
FIG. 1 is a schematic illustration of an exemplary electrically variable transmission coupled to an engine and a final drive according to the principles of the present disclosure.
Figure 2:
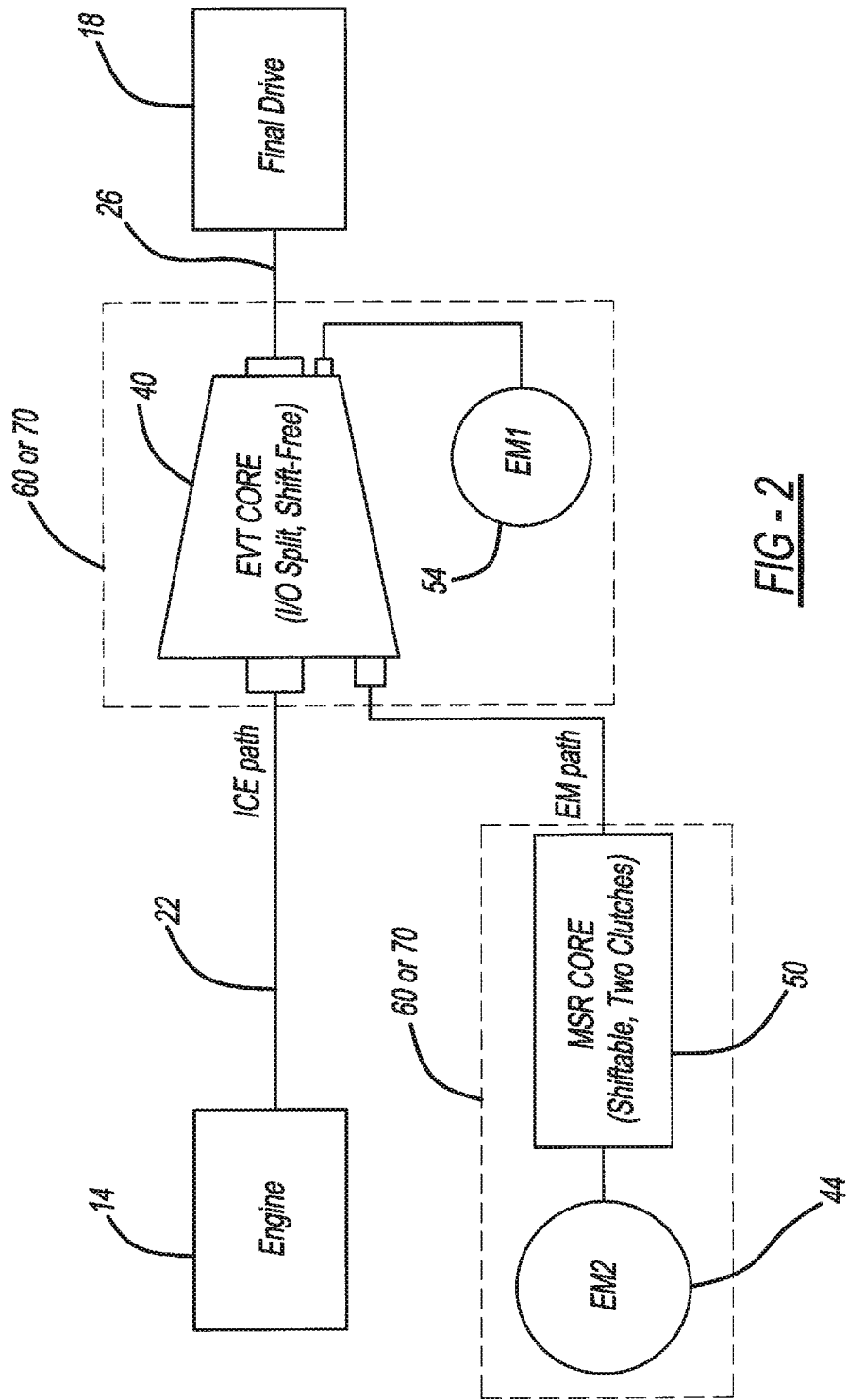
FIG. 2 is a schematic illustration of the exemplary electrically variable transmission coupled to the engine and the final drive according to the principles of the present disclosure.

Referring now to the drawings, where like reference numerals refer to like components or features, FIGS. 1 and 2 schematically illustrate one example of a modular multi-mode electrically variable transmission (EVT) designated generally by reference numeral 10. The EVT 10, as shown, is coupled to a prime mover, such as an engine 14, and a final drive 18. In the example configuration shown in FIGS. 1 and 2, the engine 14 includes an output shaft that serves as an input 22 to the EVT 10. An output 26 of the EVT 10 is coupled to the final drive 18 to deliver driving power to the wheels 30 of an associated vehicle 32.

In the exemplary implementation illustrated, EVT 10 includes a shift-free compound input-output split EVT core 40 associated with a secondary or adaptive electric motor-generator 54 and a shiftable motor speed reducer (MSR) 50 core associated with a primary or main electric motor-generator 44. As will be discussed in greater detail below, the EVT 10 includes a modular and scalable design that is configurable for various different vehicle architectures (e.g., front wheel drive (FWD) and rear wheel drive (RWD)) and in various orientations.

In one exemplary implementation, each core of EVT 10 is provided in a subassembly or module such that EVT 10 includes two modules (e.g., EVT core 40 and MSR core 50) that are configurable for various different vehicle and/or powertrain requirements. This modular configuration provides for sharing and/or duplicating of various main components of EVT 10 so as to achieve cost and manufacturing synergies. For example, and as will be further discussed below, the two cores 40, 50 can share main planetary gear components as well as be coupled together to form assembled EVT 10 in an offset configuration for FWD applications and an axially aligned or longitudinal configuration for RWD applications thereby reducing cost and complexity of hybrid transmission design for a vehicle manufacturer. As will also be discussed in greater detail below, assembled EVT 10 may include an optional input brake to provide an electric-only mode and is configured, in one exemplary implementation, to provide brake-free hill holding capability. In addition, EVT 10 does not require a torque converter 36, which is shown schematically in broken lines in FIG. 1.

Figure 3A:
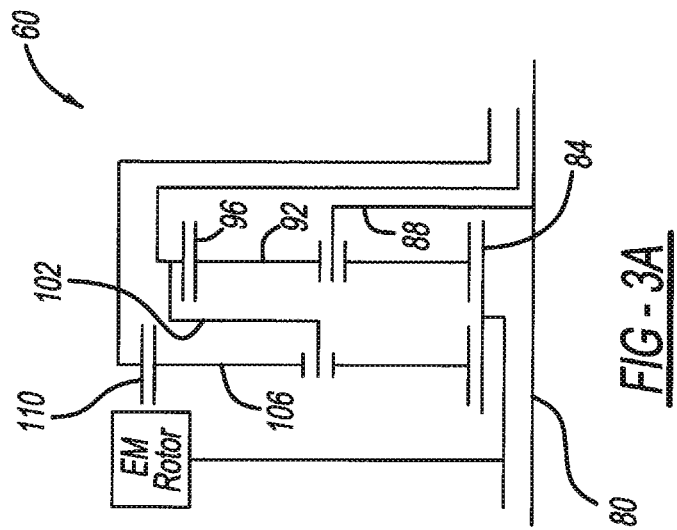
FIGS. 3 and 3A are schematic illustrations of an exemplary module of the electrically variable transmission according to the principles of the present disclosure.
Figure 3:
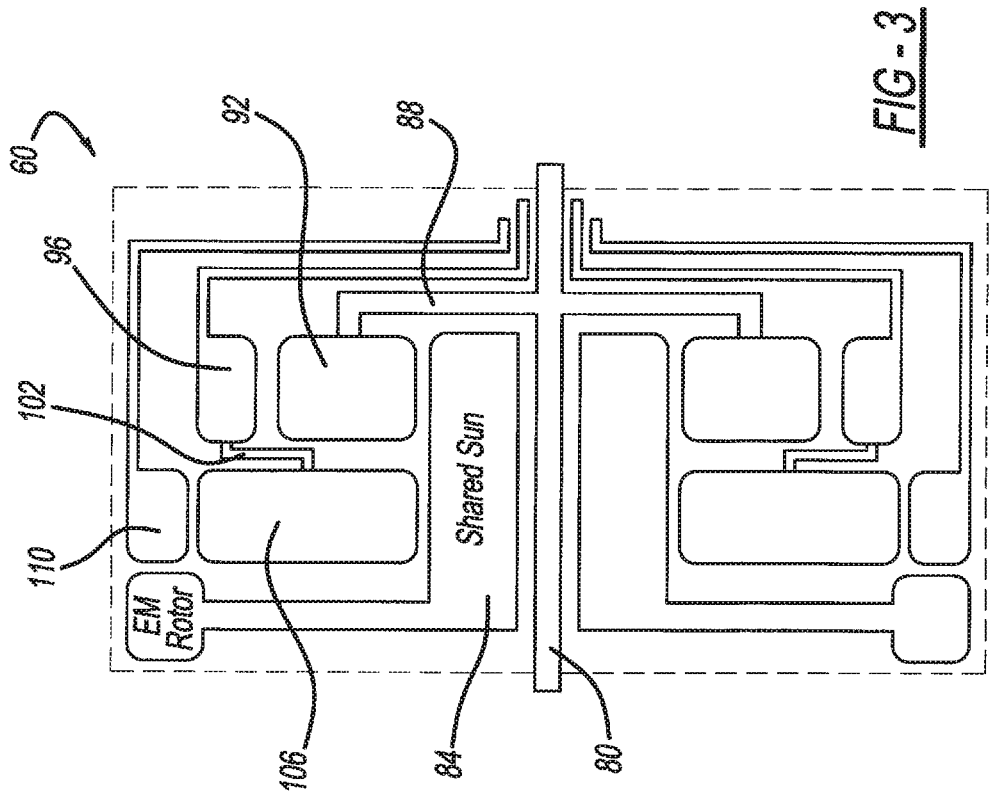
Figure 4A:
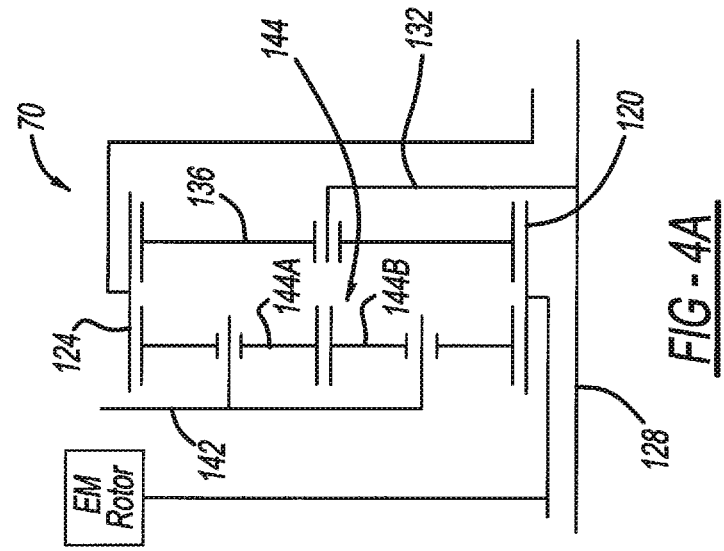
FIGS. 4 and 4A are schematic illustrations of another exemplary module of the electrically variable transmission according to the principles of the present disclosure.
Figure 4:
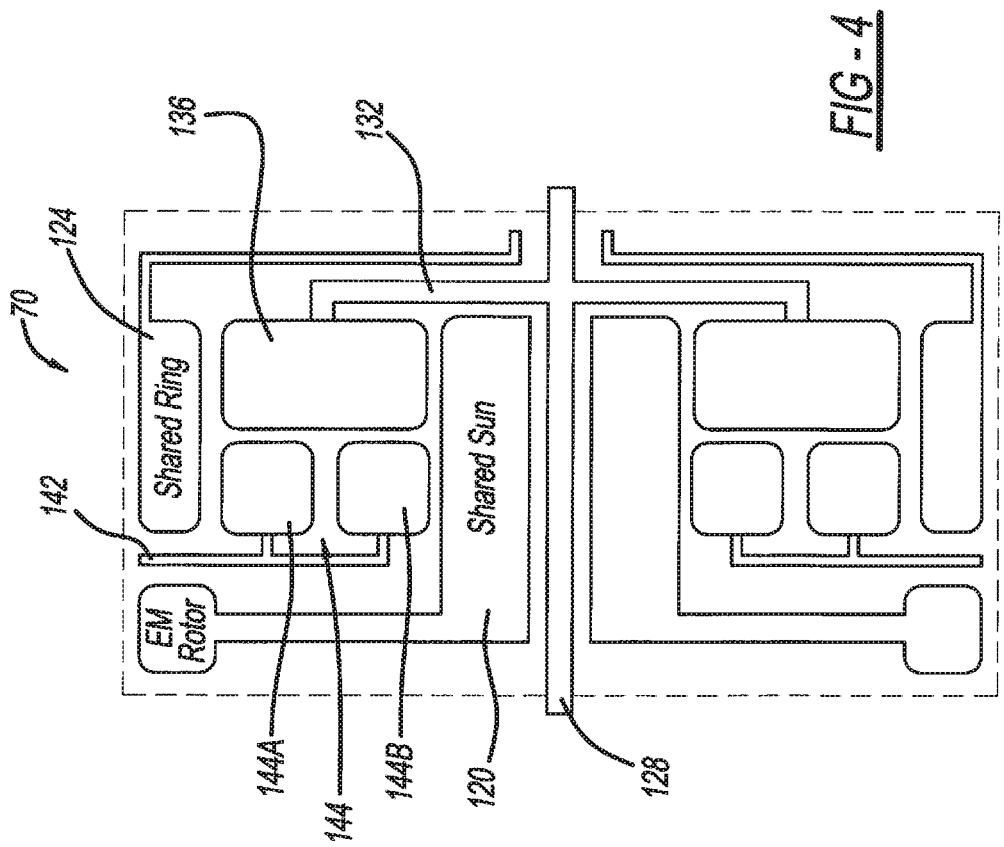

With particular reference to FIGS. 3-4A and continuing reference to FIGS. 1 and 2, two exemplary modules or subassemblies 60, 70 are shown that are combinable in different configurations to form different variations of the assembled EVT 10. As will be discussed in greater detail below, the modules 60, 70 share the same four node lever diagram and can be duplicated (e.g., module 60 plus module 60) or combined (e.g., module 60 plus module 70) to form different configurations of EVT 10 in both offset and coaxial assemblies.

The exemplary implementation of module 60 shown in FIGS. 3 and 3A includes a shared sun configuration, two planetary gear sets and an integrated electric motor. In the exemplary implementation illustrated, module 60 includes a central input member or shaft 80, a shared sun gear 84, a first or inner or primary carrier member 88, a first or primary set of pinion gear members 92, a first or inner or primary ring gear member 96, a secondary or outer carrier member 102, a second set of pinion gear members 106 and a second or outer ring gear 110. In this exemplary configuration, the central input member 80 is non-rotatably coupled to the inner carrier member 88, which rotatably supports the first set of pinion gear members 92. The first set of pinion gear members 92 are in constant meshing engagement with the shared sun gear 84 and the inner ring gear member 96. The second carrier member 102 is coupled to the inner ring gear and rotatably supports the second set of pinion gear members 106. The second set of pinion gear members are in constant meshing engagement with the outer ring gear 110 and the shared sun gear 84. The electric motor associated with and integrated into module 60 is non-rotatably coupled to the shared sun gear 84.

In this exemplary implementation of module 60, the shared sun gear member 84, the inner carrier member 88 and the inner and outer ring gears 96, 110 are coaxial with each other and the central input member 80. As will be discussed in greater detail below, module 60 utilizes two planetary gear sets and provides for greater freedom of design with two separate rings (e.g., more ratios) while reducing complexity with a shared sun gear 84 among the two planetary gear sets.

With particular reference to FIGS. 4 and 4A, an exemplary implementation of module 70 is shown and will now be discussed in greater detail. Module 70, in one exemplary implementation, includes a shared sun gear member 120 and a shared ring gear member 124 together with an integrated electric motor. In this exemplary implementation, module 70 includes a central input member 128, a first or primary carrier member 132, a first or primary set of planetary gear members 136, a second carrier member 142 and a compound planetary gear set 144.

The integrated electric motor in module 70 is non-rotatably coupled to the shared sun gear 120, which can be the same or a different shared sun gear as shared sun gear member 84 of module 60. In accordance with an aspect of the present disclosure, the input member 128 is non-rotatably coupled to the first carrier member 132, which rotatably supports the first set of planetary gear members 136. The first set of planetary gear members 136 are in constant meshing engagement with the shared sun gear member 120 and the shared ring gear member 124. The second carrier member 142 positions the compound planetary gear set 144 in constant meshing engagement with the shared sun gear 120 and the shared ring gear 124. In particular, in the exemplary implementation illustrated, the compound planetary gear set 144 includes a plurality of outer planet gears 144A in constant meshing engagement with the shared ring gear 124 and a corresponding plurality of inner planet gears 144B, which are in constant meshing engagement with the shared sun gear 120.

By utilizing both a shared sun gear 120 and a shared ring gear 124, module 70 provides for a more compact sub-assembly, which provides for an ultimately more compact assembled EVT 10. Module 70, however, may provide for less design freedom (e.g., ratios) with the shared ring gear 124 as compared to the separate ring gears 96, 110 in module 60.

As briefly discussed above, modules 60 and 70 can be duplicated or combined to provide four options for both a coaxial assembled EVT 10 configuration and a lay shaft or offset assembled EVT 10 configuration. More specifically, for both the coaxial and offset configurations of assembled EVT 10, the four options include: (i) duplicating module 60, (ii) duplicating module 70, (iii) combining module 60 and module 70 (with module 60 receiving input from engine 14), or (iv) combining module 70 with module 60 (with module 70 receiving input from engine 14). In each instance or combination option, one of the modules 60, 70 serves as the EVT subassembly or core 40 for shift free input/output splits and the other of the modules 60, 70 serves as the MSR subassembly or core for shiftable electric motor torque gains. Thus, the modules 60, 70, which share the same lever diagram, can be combined in various configurations for various different vehicle needs and/or architectures. This provides for, as discussed above, reducing cost and complexity associated with designing separate EVTs for FWD and RWD architectures and/or separate EVTs for smaller vehicle platforms where packaging constraints are tighter than other vehicle platforms. For example, module 70 can be duplicated for smaller vehicle platforms to provide a more compact EVT assembly.

In accordance with an aspect of the present disclosure, EVT 10 can be assembled from a kit or provided in kit form, where the kit includes module 60 and module 70 as subassembly options for assembled EVT 10. In this regard, an automotive manufacturer can, in one exemplary aspect, maintain the two modules 60, 70 in the form of a kit and manufacture (i.e., assemble) various different configurations of EVT 10 having the EVT core 40 and the MSR core 50 in one or more of the optional combinations (i)-(iv) discussed above in both a coaxial and an offset or lay shaft assembled configuration. Thus, in one exemplary implementation, EVT 10 can be assembled from the kit of modules 60, 70 into eight different assembled configurations using only modules 60, 70 and a lay shaft and transfer gear for certain of the eight combinations.

Two example combinations of modules 60 and 70 to form assembled EVT 10 (one coaxial and one lay shaft) are discussed below with particular reference to FIGS. 5 and 6. It will be appreciated that while only two of the eight possible combinations are specifically discussed below, those skilled in the art will readily appreciate that the other combinations are similarly combinable as each module shares the same four node lever diagram, as will also be discussed below in greater detail.

Figure 5:
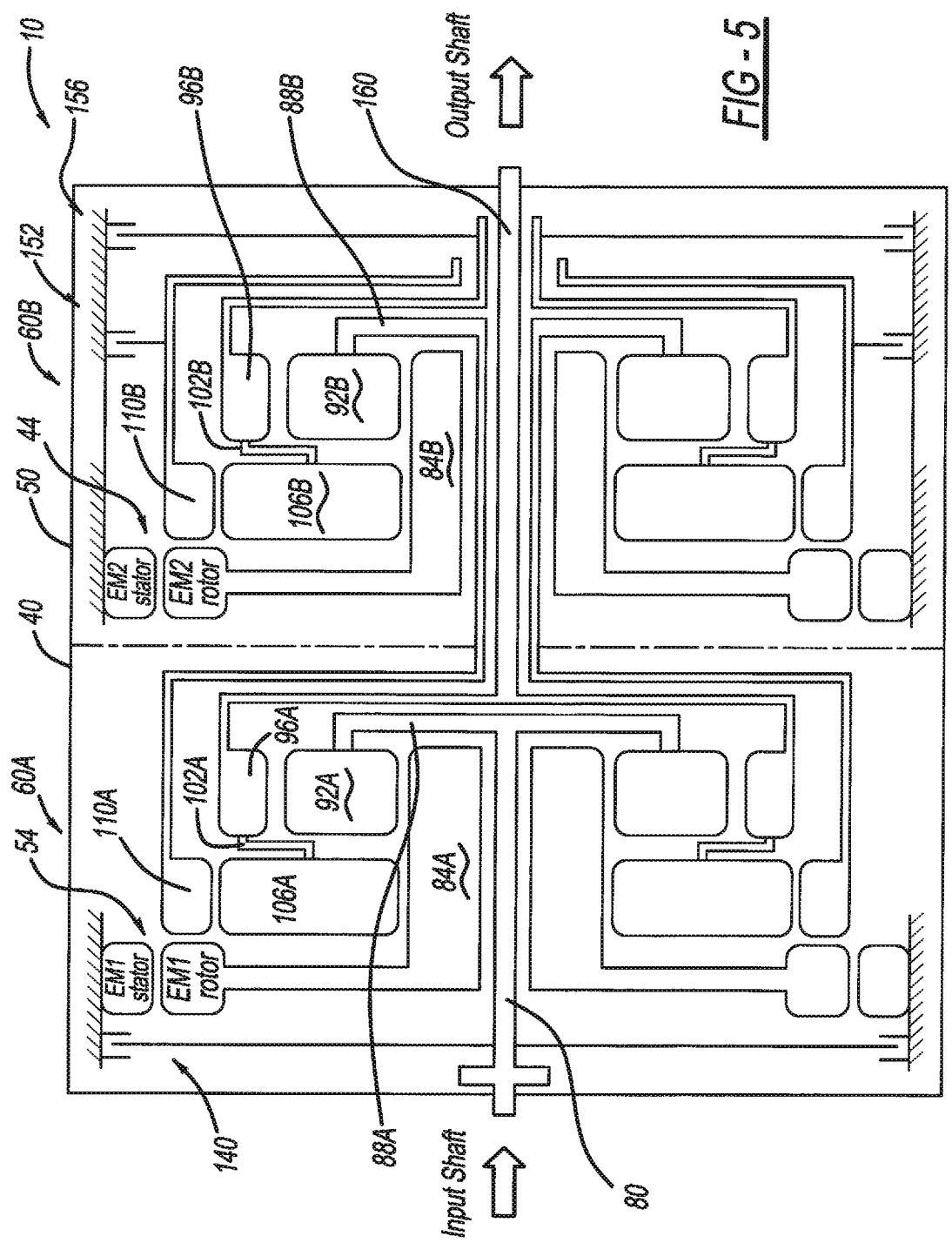
FIG. 5 is a schematic illustration of an exemplary electrically variable transmission having two transmission modules coupled together in a coaxial configuration according to the principles of the present disclosure.

FIG. 5 illustrates one example module combination where module 60 is duplicated to form EVT 10 in a coaxial or longitudinally aligned arrangement for a RWD application. It will be appreciated that while the discussion will continue with reference to module 60 being duplicated as an example of EVT 10 in a coaxial assembly, combination options (ii)-(iv) discussed above could also be utilized to form EVT 10 in the coaxial assembly configuration. For clarification purposes only with respect to FIG. 5, the module 60 in FIG. 5 that is coupled to engine 14 is referred to as module 60A and the module 60 that is coupled to module 60A will be referred to as module 60B. In this regard, common components of applicable, the suffix "A" and common components of module 60B in FIG. 5 may include, where applicable, the suffix "B".

In the exemplary implementation illustrated in FIG. 5, module 60A functions as the EVT core 40 with shift-free input and output power splits and module 60B functions as the MSR core 50 for shiftable electric motor torque amplification or gains. In accordance with an aspect of the present disclosure, module 60A is connected to the engine 14 (see also FIGS. 1 and 2) and module 60B is connected to module 60A (see also FIGS. 1 and 2). In this implementation, the integrated electric motor associated with module 60A (i.e., EVT core 40) is the adaptive electric motor 54 and the integrated electric motor associated with module 60B (i.e., MSR core 50) is the primary electric motor 44. This implementation of assembled EVT 10 can also include an optional input brake 140 associated with module 60A for electric-only modes of operation, and first and second torque transmission devices, such as brakes or clutches 152, 156, associated with module 60B for shiftable torque amplification, as will be discussed in greater detail below.

Continuing with reference to FIG. 5, the inner ring gear 96A is non-rotatably coupled to a central output member or shaft 160, which is non-rotatably coupled to the final drive 18 (see also FIGS. 1 and 2). Outer ring gear 110A is non-rotatably coupled to carrier 88B. First clutch 152 can be controlled to selectively ground outer ring gear 110B and second clutch 156 can be controlled to selectively ground inner ring gear 96B to provide two different selective electric motor torque rations or amplifications. The input shaft 80 of module 60A and the output shaft 160 of module 60B are coaxial and longitudinally arranged in this configuration of assembled EVT 10, as shown for example in FIG. 5.

Figure 6:
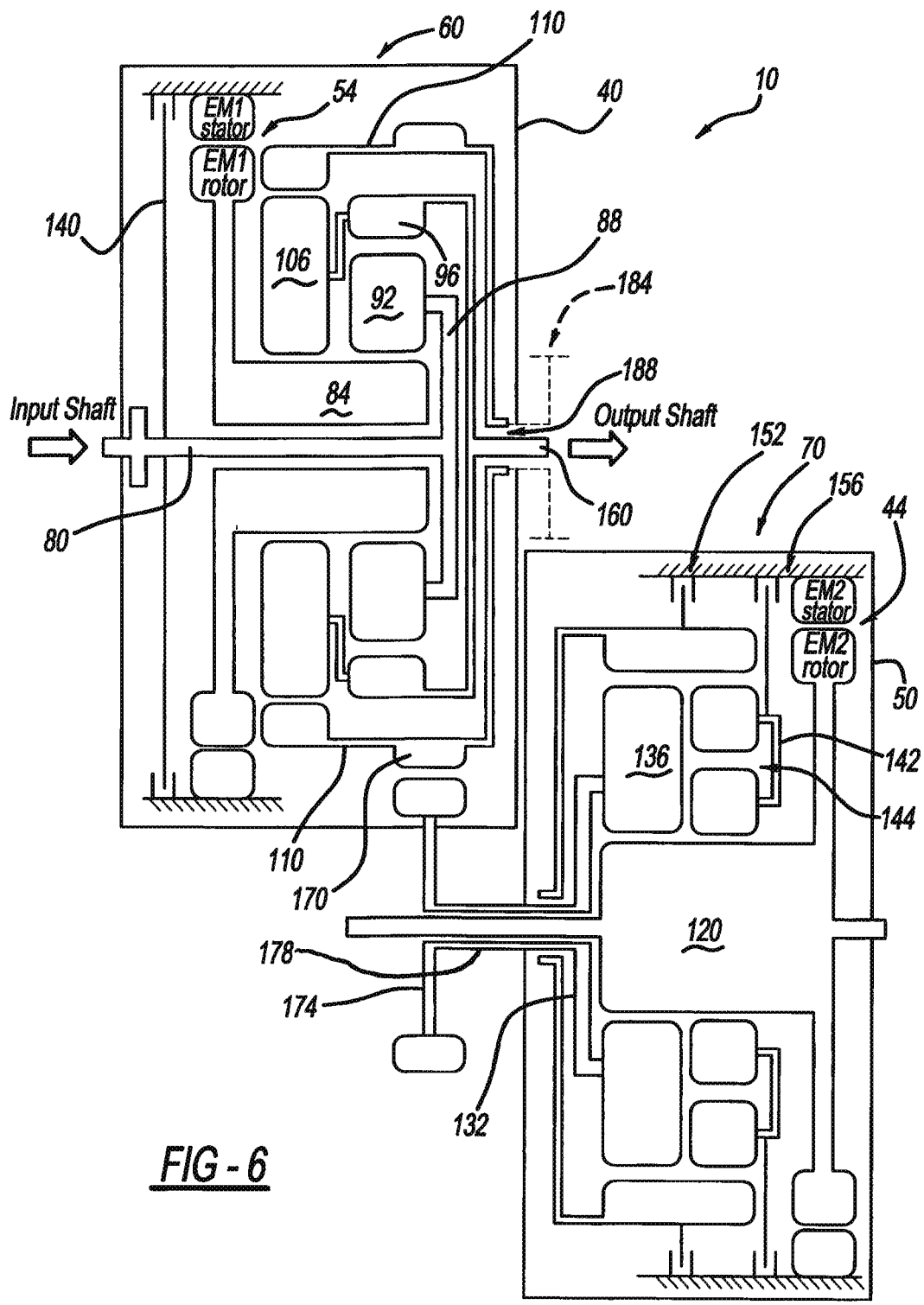
FIG. 6 is a schematic illustration of an exemplary electrically variable transmission having two transmission modules coupled together in an offset configuration according to the principles of the present disclosure.

FIG. 6 illustrates another example combination to form assembled EVT 10 in an offset or lay shaft configuration. As with the example discussed above in connection with FIG. 5, it will be appreciated that while the discussion will continue with reference to Module 60 and Module 70 being assembled to form EVT 10 (i.e., combination option (iv)), combination options (i)-(iii) discussed above could also be utilized. In this implementation of assembled EVT 10, module 60 functions as the EVT core 40 with input member 80 coupled to engine 14 (see also FIGS. 1 and 2), and module 70 functions as the MSR core 50. Similar to the coaxial implementation of assembled EVT 10 shown in FIG. 5, module 60 in FIG. 6 includes the optional input brake 140 coupled to input member 80 to selectively provide an electric only mode of operation and inner ring gear 96 is coupled to output shaft or member 160, which may be coupled to final drive 18 (see also FIGS. 1 and 2). Module 70 includes first clutch 152 for selectively grounding shared ring 124 and second clutch 156 for selectively grounding second carrier member 142. In the implementation of assembled EVT 10 shown in FIG. 6, the integrated electric motor in Module 60 includes the adaptive electric motor 54 and the integrated electric motor of module 70 includes the primary electric motor 44.

In this offset implementation of EVT 10, outer ring gear 110 of module 60 includes outer gear teeth 170 in meshing engagement with a coupling gear 174 connected via a lay shaft 178 to first carrier member 132. It will be appreciated that coupling gear 174 can alternatively be coupled to outer ring gear 110 in another location, such as via an optional gear 184 associated with a central location 188 of outer ring gear 110, as shown in broken lines in FIG. 6. The implementation utilizing outer gear teeth 170, however, provides for a more axially compact offset configuration that may be particularly suited for FWD applications.

Figure 7:
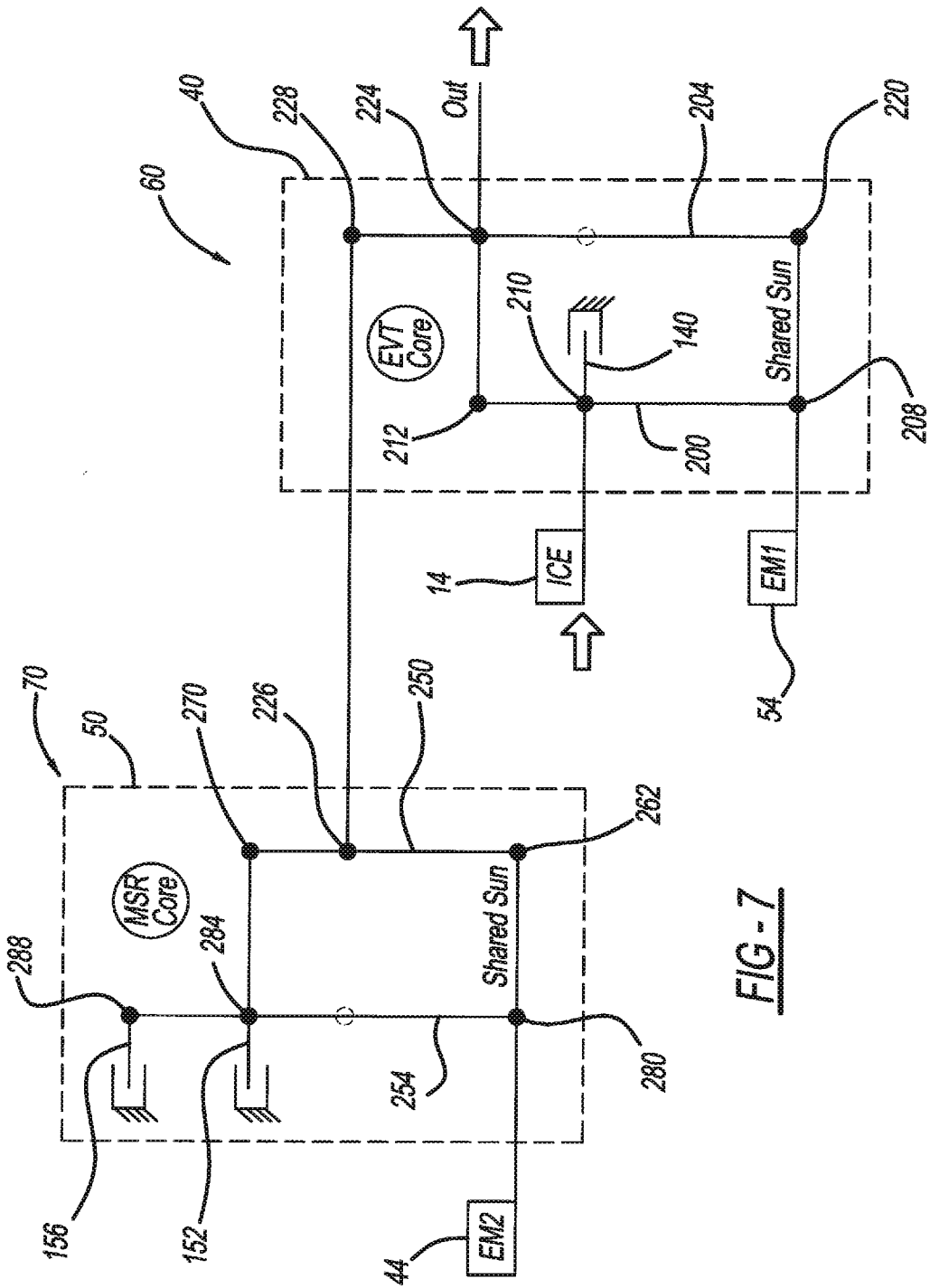
FIGS. 7, 7A and 7B are schematic illustrations in lever diagram format of the exemplary electrically variable transmission of FIG. 6 according to the principles of the present disclosure.
Figure 7A:
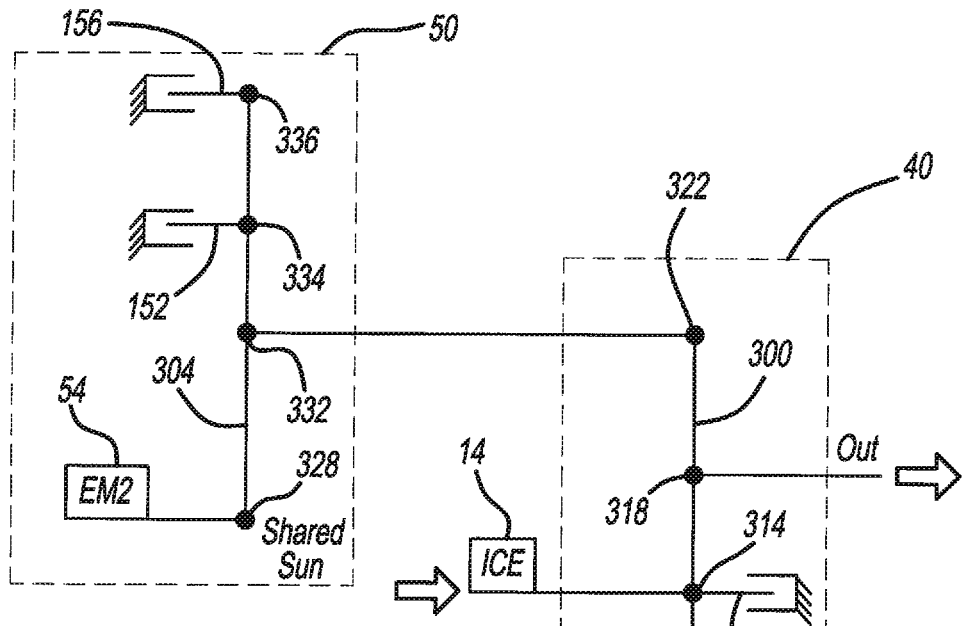
Figure 7B:
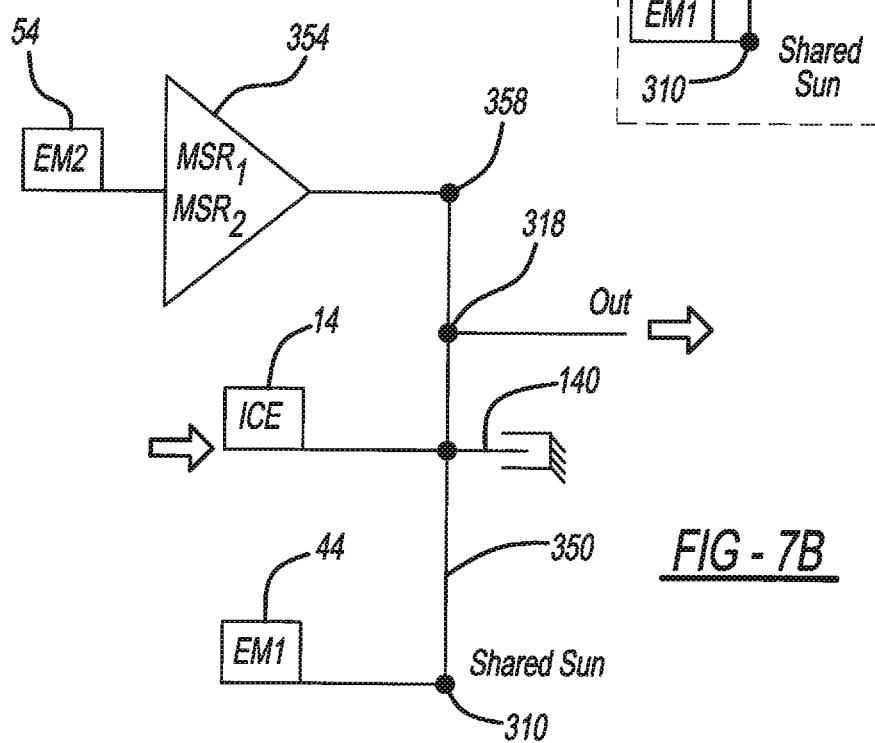

Turning now to FIGS. 7-7B, module 60 and module 70 are shown in lever diagram form as the EVT core 40 and MSR core 50, respectively, of assembled EVT 10 in the offset configuration. Those skilled in the art will readily recognize the application of EVT 10 in lever diagram form shown in FIGS. 7-7B to the schematic illustrations of EVT 10 assembled in the offset configuration shown in FIG. 6 as well as the coaxial configuration shown in FIG. 5 because both modules 60, 70 share the same four node lever diagram, as will be discussed in greater detail below.

Briefly, however, and with continued reference to FIG. 6 as an example, the first or primary planetary gear set is represented by a first lever 200 and the second or secondary planetary gear set is represented by a second lever 204. The first lever 200 includes three nodes 208, 210 and 212 corresponding to the shared sun gear member 84, the carrier 88 and the inner ring gear 96, respectively. The second lever 204 includes three nodes 220, 224, 228 corresponding to the shared sun gear member 84, the second carrier 102 and the outer ring gear 110. As can also be seen in FIG. 7 with reference to FIG. 6, the adaptive electric motor 54 is coupled to the shared sun gear member 84 at node 208 and the engine 14 is coupled to carrier 88 at node 210. The inner ring gear 96 represented by node 212 of lever 200 is coupled via carrier 102 to node 224 of lever 204.

Continuing with reference to FIGS. 6 and 7, the outer ring gear 110 represented at node 228 is coupled via coupling gear 174 and lay shaft 178 to the MSR core 50. As discussed above, MSR core 50 is formed by module 70 in this exemplary implementation and is represented in FIG. 7 with a first lever 250 and a second lever 254 corresponding to the two planetary gear sets in module 70. First lever 250 includes three nodes 262, 266, 270 corresponding to shared sun gear 120, first carrier 132 and shared ring 124, respectively. Second lever 254 includes three nodes 280, 284, 288 corresponding to shared sun gear 120, shared ring 124 and second carrier 142, respectively. As discussed above, first clutch 152 is associated with shared ring 124 and thus node 284 and second clutch 156 is associated with second carrier 142 and thus node 288. Primary electric motor 44 is non-rotatably connected to shared sun gear 120 and is thus shown associated with node 280.

It will be appreciated by those skilled in the art that while FIGS. 7-7B are discussed with reference to the offset configuration in FIG. 6, the lever diagrams apply equally to the coaxial configuration as each assembly is represented ultimately by a four-node lever diagram, which is discussed below in greater detail. In addition, the lever diagram for the assembled EVT 10 provides a simplified schematic illustration of the compound input-output split of EVT core 40. In particular, in the exemplary lever diagram illustration of FIG. 7, node 210 and lever 200 schematically illustrate the input split and node 224 and lever 204 similarly schematically illustrate the output split.

For discussion purposes, the lever diagrams of FIG. 7 can be simplified to one lever diagram for each core or subassembly of assembled EVT 10. In accordance with one aspect of the present disclosure, FIG. 7A illustrates such a simplification for the offset or coaxial configurations of assembled EVT 10 shown schematically in FIGS. 5 and 6 and in expanded lever diagram form in FIG. 7. More specifically, FIG. 7A illustrates one lever 300 for module 60 functioning as the EVT core 40 in this exemplary implementation, and one lever 304 for module 70 functioning as the MSR core 50. As will be appreciated by those skilled in the art, lever 300 is a simplified combination of levers 200 and 204, and lever 304 is similarly a simplified combination of levers 250 and 254.

In the example illustrated in FIG. 7A, lever 300 includes a shared sun node 310 associated with adaptive electric motor 54, a first carrier or lower node 314 associated with engine 14 and optional input brake 140, an upper node 318 representing the coupled inner ring gear 96 and the second carrier 102 and associated with the output of the transmission, and a top node 322 representing the outer ring 110 and coupling point to lever 304 representing the MSR core 50. Lever 304 includes a shared sun node 328 associated with the primary electric motor 44, a lower or carrier node 332 representing first carrier 132, an upper node 334 representing shared ring 124 and associated with first clutch 152 and a top node 336 representing second carrier 142 and associated with the second clutch 156.

FIG. 7B illustrates a single lever 350 representing assembled EVT 10 utilizing module 60 and module 70 functioning as the EVT core 40 and the MSR core 50, respectively. It will be appreciated, however, that since modules 60, 70 share the same lever diagram, single lever 350 is utilized to represent assembled EVT 10 in any combination of modules 60, 70. Lever 350 combines the multi-speed capability of lever 304 into a representation 354 of two motor speed ratios associated with primary electric motor 44 and a combined top node 358. The other nodes 310, 314 and 318 remain the same as discussed above for lever 300. Those skilled in the art will readily appreciate that the lever diagram of FIG. 7B, as well as those of FIGS. 7 and 7A, can be utilized to illustrate various operational conditions of assembled EVT 10, examples of which will be discussed below in greater detail.

As discussed above, the assembled EVT 10 according to various aspects of the present disclosure includes a modular configuration that is configurable and scalable into various different assembled EVTs. By utilizing two core modules, namely the EVT core 40 and the MSR core 50, that each share the same ultimate 4-node lever diagram, the various different assembled configurations of EVT 10 can be formed using two of the modules or sub-assemblies 60, 70. This provides for an automobile manufacturer being able to utilize one core EVT system across various different platforms with options for FWD and RWD configurations. Moreover, each of the modules 60, 70 can share main components which provides for further cost and complexity reduction.

In accordance with various aspects of the present disclosure, the assembled EVT 10 includes the shift-free EVT core 40 with the compound input-output split and the shiftable MSR core 50 having two clutches 152, 156 providing for two selective torque amplification ratios or gains of the primary electric motor 44. In one exemplary aspect, the assembled EVT 10 includes the MSR core 50 with two shiftable gains associated with the primary electric motor 44 and does not include a MSR specifically associated with the engine 14 (e.g., in the engine path shown in FIG. 2). Associating the shiftable MSR core 50 with the primary electric motor 44 provides for improved control and faster response times (e.g., less lag), as well as less vibration than if the MSR core 50 was in the engine 14 path. Further, this exemplary implementation with the MSR core 50 in the primary electric motor 44 path provides for more efficient use of the primary electric motor 44 (e.g., ability to use a smaller electric motor with amplification capability) as well as more efficient torque amplification than with the engine 14.

Figure 9:
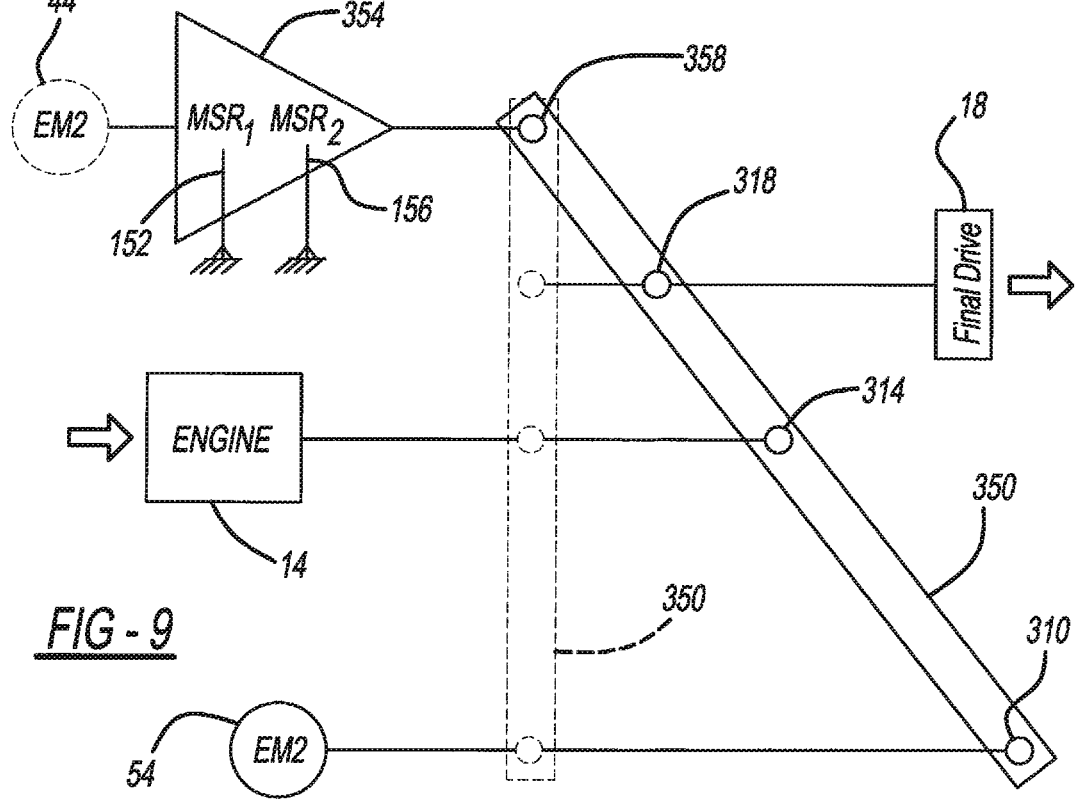
FIG. 9 is a schematic illustration depicted in lever diagram format of an electrically variable transmission in an exemplary towing mode of operation according to the principles of the present disclosure.

In accordance with various aspects of the present disclosure, the input-output split EVT core 40 of assembled EVT 10 provides the ability to ground the primary electric motor 44 via selective engagement of the two clutches 152, 156 of MSR core 50 to provide a fixed drive for towing, as shown for example in FIG. 9 with reference to the exemplary assembled EVT 10 configuration shown in FIG. 7. The input-output split of the EVT core 40 provides for the primary electric motor 44 to be decoupled from the output or final drive 18, which together with the shiftable MSR core 50 in the primary electric motor 44 path, provides the ability to ground the primary electric motor 44 and utilize the native fixed gear of the assembled EVT 10 for towing. Conventional EVTs with only an input split design and/or a shift-free MSR do not provide the ability to efficiently ground the primary electric motor for a fixed drive operating mode. As one of ordinary skill in the art will readily appreciate, in such a conventional EVT with an input split only configuration, the main electric motor speed is directly coupled to or associated with the final drive.

According to various aspects of the present disclosure, assembled EVT 10 includes the optional input brake 140 associated with the EVT core 40 and configured to be controlled to selectively ground the input member 80 and thus the engine 14. Selectively grounding the input member 80 provides for an electric-only mode of operation for EVT 10. It will be appreciated that assembled EVT 10 can include the input brake 140 in module 60 or module 70, either of which can be used in the various assembly options to form EVT core 40 for assembled EVT 10.

With input brake 140 engaged to ground the engine 14, assembled EVT 10 is capable of launching the vehicle and providing propulsive torque in both forward and reverse directions utilizing only electric motors 44 and 54. In a conventional EVT without an input grounding device, one of the electric motors would typically need to provide reaction torque to hold the engine at zero speed while the second electric motor would provide driving torque. Here, the controlled input brake 140 can selectively ground input member 80 to provide such reaction torque.

The ability to use both electric motors 44, 54 to provide driving torque in both forward and reverse directions via the controlled input brake 140 provides additional advantages with regard to launching the vehicle from a stop. This is particularly advantageous when launching the vehicle while positioned on a steep grade, where more torque is required than on a level road surface. In this scenario, those skilled in the art will appreciate that a conventional or single mode EVT without an input brake typically cannot generate enough drive torque from the one of the two electric motors that serves as the traction motor, especially since a reserve is typically necessary to protect for starting the associated engine.

Moreover, with controlled input brake 140 grounding input member 80 and thus engine 14, the torque or load can be split among or between electric motors 44, 54 thereby providing for improved operational efficiencies and reduced operating temperatures of electric motors 44, 54. The controlled input brake 140 can also provide improved drive and regenerative braking efficiency of assembled EVT 10 by reducing total system loss by minimizing the sum of the electric motors 44, 54 and engine 14 losses. With the assembled EVT 10 disclosed herein, the controlled input brake 140 can also be used to simplify the on-to-off transition of engine 14, since the controlled input brake 140 can be operated in a controlled slip manner so as to apply a torque directly to the engine 14 to slow it down at a desired rate. Using controlled input brake 140, electric motor 54 is not required to provide reaction torque and can thus also assist in braking.

In addition, the exemplary configurations of assembled EVT 10 discussed herein utilizing the shiftable MSR core 50 associated with the primary electric motor 44 and the controlled input brake 140 associated with the EVT core 40 and engine 14, provide for the ability to ground both the engine 14 via brake 140 and one of the two clutches 152, 156 associated with MSR core 50. Thus, the assembled EVT 10 provides for shiftable torque amplification in electric only mode in accordance with various aspects of the present disclosure.

In accordance with various aspects of the present disclosure, assembled EVT 10 provides brake-free hill holding capability through use of the input-output split EVT core 40 and the MSR core 50. As one of ordinary skill in the art will readily appreciate, a conventional EVT having the main electric motor directly coupled to the final drive (i.e., input-split only) is not capable of supplying torque at zero speed.

Figure 8:
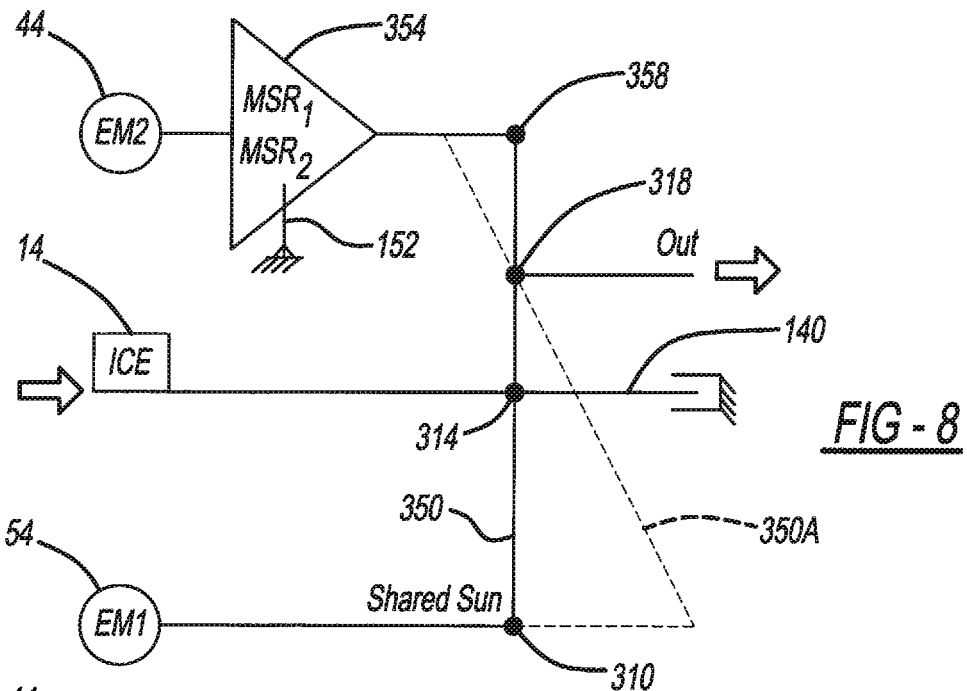
FIG. 8 is a schematic illustration depicted in lever diagram format of an electrically variable transmission in an exemplary hill holding mode of operation according to the principles of the present disclosure.

With particular reference to FIG. 8 (and general reference to FIGS. 5-7B), an exemplary operating mode of assembled EVT 10 for brake-free hill holding is shown in lever diagram form using the simplified lever 350 from FIG. 7B. It will be appreciated that the brake-free hill hold operating mode discussed below is one example of assembled EVT 10's brake-free hill holding capabilities in both up-hill and down-hill holding scenarios. In FIG. 8, the brake-free hill holding operating mode is represented by lever 350A shown in broken line format. As can be seen, upper node 318 representing an output of assembled EVT 10 is held at zero speed while secondary electric motor 54 functions as a traction motor and the primary electric motor 44 functions as a generator. In this exemplary implementation, MSR clutch 152 can be engaged and engine 14 is controlled to fuel shut-off while optional input brake 140 is open or not engaged to allow rotation of a crankshaft of engine 14. Thus, in this exemplary implementation, torque is co-supplied by electric motors 44, 54 with engine 14 at a fuel shut-off condition to provide brake-free hill holding without requiring a torque converter to be associated with a vehicle powertrain including EVT 10. Brake-free hill holding can be particularly advantageous in high traffic conditions and various off-road and/or rock crawl scenarios.

Figure 10:
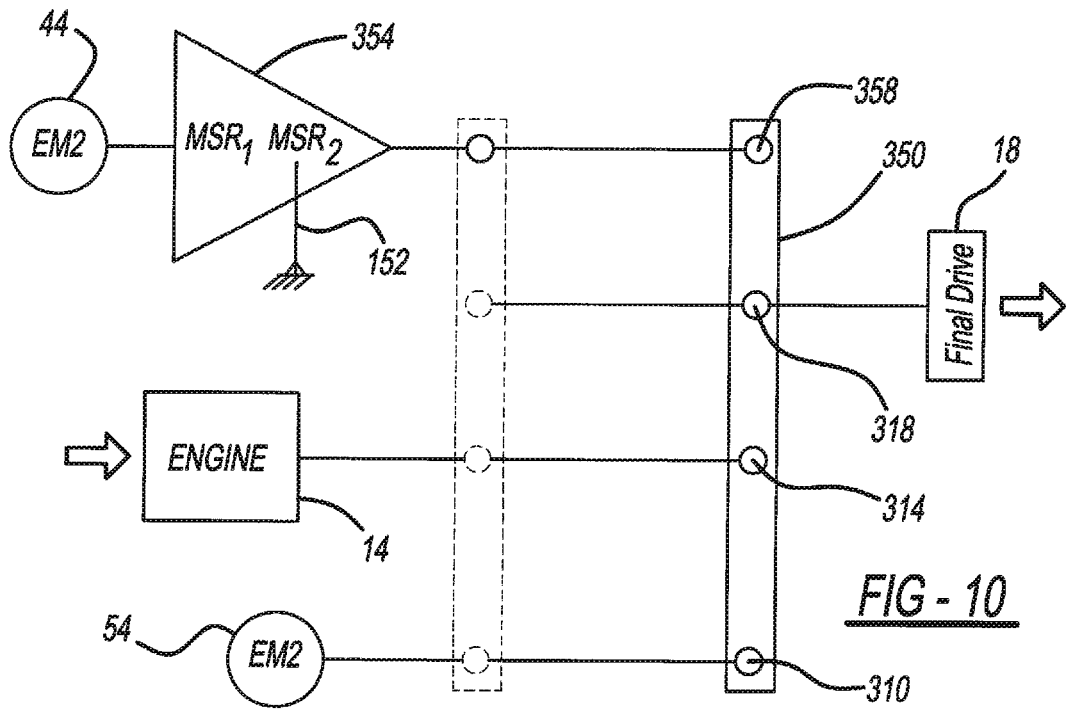
FIG. 10 is a schematic illustration depicted in lever diagram format of an electrically variable transmission in an exemplary hybrid drive mode of operation according to the principles of the present disclosure.

With particular reference to FIG. 9, assembled EVT 10 is shown in a towing mode of operation utilizing lever 350. As discussed above, assembled EVT 10 having both the input split and the output split of EVT core 40 provides the ability to ground both clutches 152 or MSR$_1$ and 156 or MSR$_2$ of MSR core 50, thereby providing a fixed native gear for towing and/or other similar purposes. FIG. 10 illustrates one exemplary hybrid drive operating mode where propulsive torque is provided by both the engine and electric power sources. It will be appreciated that while FIG. 10 illustrates clutch 156 or MSR$_2$ being grounded, clutch 152 or MSR$_1$ could also be grounded for hybrid drive operation, as will be readily appreciated by those skilled in the art.

Figure 11:
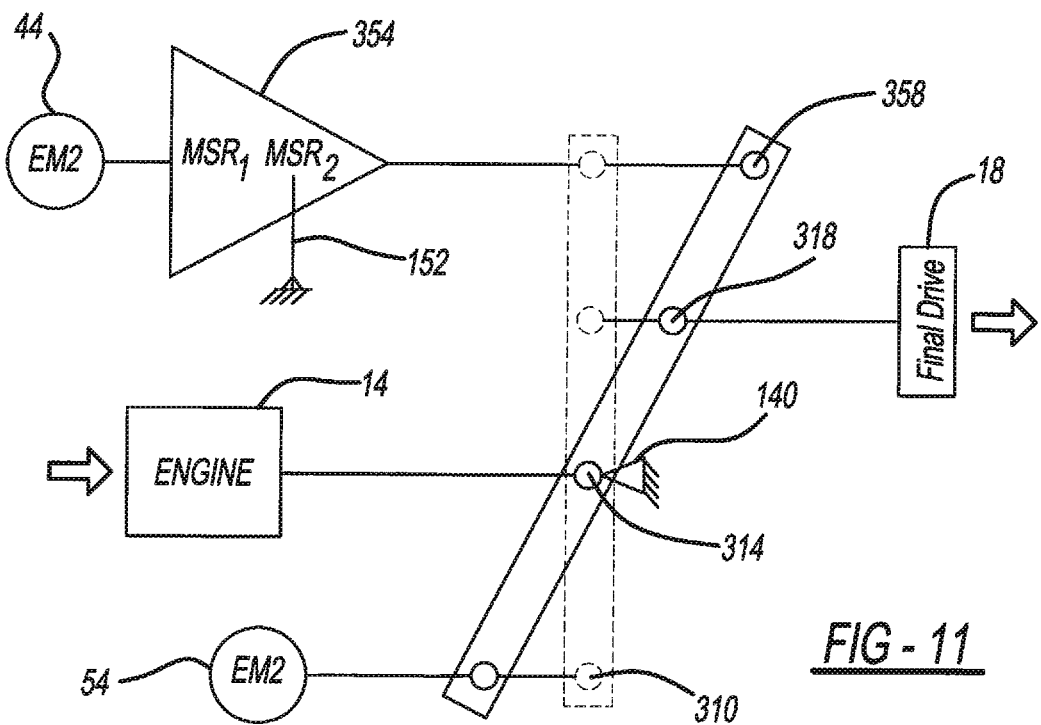
FIG. 11 is a schematic illustration depicted in lever diagram format of an electrically variable transmission in an exemplary electric drive mode of operation according to the principles of the present disclosure.

FIG. 11 illustrates one example of an electric drive operating mode of assembled EVT 10 again utilizing lever 350. In the illustrated example, engine 14 is grounded via input brake 140 and clutch 156 or MSR$_2$ is controlled to ground the top node of the second planetary gear set of MSR core 50 to provide the desired torque amplification of primary electric motor 44. Similar to the discussion above, it will be appreciated that clutch 152 or MSR$_1$ could alternatively be utilized to ground the upper node of the first planetary gear set of MSR core 50 when a different torque amplification of primary electric motor 44 is desired or required.

As discussed herein, assembled EVT 10 provides an architecture that is both modular and scalable thereby providing the ability to combine two core sub-assemblies or modules in four different configurations. This capability provides for reducing the cost and complexity for an automotive manufacturer to both design and manufacture an EVT. For example, the modular and scalable nature of the core modules of assembled EVT 10 provides for such modules to be assembled in both FWD configurations (e.g., offset or lay shaft) and RWD configurations (e.g., coaxial).

Further, by providing assembled EVT 10 with a shift-free compound input-output split EVT core together with a shiftable MSR core in the primary electric motor path, assembled EVT 10 more efficiently utilizes a smaller primary electric motor and can provide improved control and faster response times due to the lack of inherent lag times associated with control of an internal combustion engine. In addition, the input-output split capability of the EVT core 40 provides assembled EVT 10 having fixed gear towing capability and brake-free hill holding capability while utilizing a less complex shift-free configuration. The option input brake 140 further provides for electric-only launching and forward and reverse propulsion.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A modular electrically variable transmission, comprising:
   one sun-shared module and one of another of the sun-shared module and a sun and ring-shared module assembled to form a two-module electrically variable transmission such that one of the two modules forms a shiftable motor speed reducer (MSR) subassembly and the other of the two modules forms an electrically variable transmission (EVT) subassembly;
   the sun-shared module including a first motor-generator, a first input member, a first primary planetary gear set and a first secondary planetary gear set each having respective primary and secondary ring gear members, carrier members and associated pinion gear members, the pinion gear members in meshing engagement with a single first shared sun gear member that is non-rotatably coupled to the first motor-generator, the first input member non-rotatably coupled to the primary carrier member; and
   the other of the two modules including a second motor-generator, a second input member, a single second shared sun gear member and a single shared ring gear member or a second primary ring gear member and a second secondary ring gear member, a second primary planetary gear set having a second primary carrier member rotatably supporting pinion gear members in meshing engagement with the second shared sun gear member and the shared ring gear member or the second primary ring gear member, and a second secondary planetary gear set having a second secondary carrier member supporting pinion gear members in meshing engagement with the shared ring gear member or the second secondary ring gear member and the second shared sun gear member that is non-rotatably coupled to the second motor-generator, the second input member non-rotatably coupled to the second primary carrier member.

2. The modular electrically variable transmission of claim 1, wherein the assembled two-module EVT includes two sun-shared modules operably coupled together with one sun-shared module forming the MSR sub-assembly and the other sun-shared module forming the EVT subassembly.

3. The modular electrically variable transmission of claim 2, wherein the MSR subassembly and the EVT subassembly are operably coupled in a coaxial configuration such that a center of rotation of each subassembly is coaxially aligned.

4. The modular electrically variable transmission of claim 2, wherein the first input member of the EVT subassembly is adapted to be coupled to an internal combustion engine and the secondary ring gear member of the EVT subassembly is non-rotatably coupled to the input member of the MSR subassembly; and
   wherein the assembled two-module EVT further comprises an output member non-rotatably coupled to the primary ring gear member of the EVT subassembly and extending thorough the first input member of the MSR subassembly.

5. The modular electrically variable transmission of claim 4, wherein the first secondary carrier member of the EVT subassembly is coupled to the first primary ring gear member of the EVT subassembly and the second secondary carrier member of the MSR subassembly is coupled to the second primary ring gear member of the MSR subassembly.

6. The modular electrically variable transmission of claim 4, further comprising:
   a first torque transmitting device and a second torque transmitting device each associated with the MSR subassembly and configured to be controlled to selectively ground the primary ring gear member and the secondary ring gear member, respectively, to selectively provide shiftable electric motor torque amplification for the motor-generator associated with the MSR subassembly.

7. The modular electrically variable transmission of claim 6, wherein selectively controlling each of the first and second torque transmitting devices to ground both the primary and secondary ring gear members provides a fixed native gear towing mode of operation for the two-module assembled EVT.

8. The modular electrically variable transmission of claim 6, wherein the EVT subassembly includes an input-split configuration provided by the first primary planetary gear set and an output-split configuration provided by the first secondary planetary gear set.

9. The modular electrically variable transmission of claim 4, further comprising a torque transmitting device associated with the EVT subassembly and configured to be controlled to selectively ground the first input member to provide an electric-only operating mode for the assembled two-module EVT.

10. The modular electrically variable transmission of claim 1, wherein the assembled two-module EVT includes one sun-shared module operably coupled with one sun and ring-shared module, with the sun-shared module forming the EVT subassembly and the sun and ring-shared module forming the MSR subassembly.

11. The modular electrically variable transmission of claim 10, wherein the MSR subassembly and the EVT subassembly are operably coupled in an axially offset configuration such that a center of rotation of each subassembly is axially offset.

12. The modular electrically variable transmission of claim 11, further comprising:
 a coupling gear operably coupling the MSR subassembly to the EVT subassembly; and
 an output member non-rotatably coupled to the primary ring gear member;
 wherein the first input member of the EVT subassembly is adapted to be coupled to an internal combustion engine and the secondary ring gear member of the EVT subassembly is in meshing engagement with the coupling gear, which is non-rotatably coupled to the second primary carrier member of the MSR subassembly.

13. The modular electrically variable transmission of claim 12, wherein the secondary ring gear member of the EVT subassembly includes inner teeth in constant meshing engagement with the secondary pinion gear members of the EVT subassembly and outer teeth in constant meshing engagement with the coupling gear.

14. The modular electrically variable transmission of claim 13, wherein the secondary carrier member of the EVT subassembly is coupled to the primary ring gear of the EVT subassembly.

15. The modular electrically variable transmission of claim 13, further comprising:
 a first torque transmitting device and a second torque transmitting device each associated with the MSR subassembly and configured to be controlled to selectively ground the second secondary carrier member and the shared ring gear member, respectively, to selectively provide shiftable electric motor torque amplification for the first motor-generator associated with the MSR subassembly.

16. The modular electrically variable transmission of claim 13, further comprising a torque transmitting device associated with the EVT subassembly and configured to be controlled to selectively ground the first input member of the EVT subassembly to provide an electric-only operating mode for the assembled two-module EVT.

17. The modular electrically variable transmission of claim 13, further comprising a lay shaft non-rotatably coupled to the second shared sun gear member of the MSR subassembly, the lay shaft rotatably supporting the coupling gear and the second primary carrier member.

18. The modular electrically variable transmission of claim 1, wherein the MSR subassembly includes first and second torque transfer devices selectively engagable to provide first and second motor speed ratios of one of the first and second motor-generators, and wherein the EVT subassembly includes a third torque transfer device selectively engagable to ground an output from an engine to provide an electric-only mode of operation.

* * * * *